US006803693B2

(12) United States Patent
Shah et al.

(10) Patent No.: US 6,803,693 B2
(45) Date of Patent: Oct. 12, 2004

(54) STATOR CORE CONTAINING IRON-ALUMINUM ALLOY LAMINATIONS AND METHOD OF USING

(75) Inventors: Manoj R. Shah, Latham, NY (US); Sameh R. Salem, Rexford, NY (US); Gerald Burt Kliman, Niskayuna, NY (US); Luana Emiliana Iorio, Clifton Park, NY (US); Judson Sloan Marte, Wynantskill, NY (US); Russell Walthers, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 292 days.

(21) Appl. No.: 10/063,327

(22) Filed: Apr. 11, 2002

(65) Prior Publication Data

US 2003/0193259 A1 Oct. 16, 2003

(51) Int. Cl.[7] ................................................ H02K 1/16
(52) U.S. Cl. ...................... 310/216; 310/259; 420/77
(58) Field of Search ............. 420/28, 77; 310/216–217, 310/259

(56) References Cited

U.S. PATENT DOCUMENTS

| 1,367,298 | A | * | 2/1921 | Burke .......................... 318/244 |
| 3,058,857 | A | | 10/1962 | Pavlovic et al. ............. 148/120 |
| 3,130,091 | A | * | 4/1964 | Carpenter et al. ........... 148/111 |
| 3,812,392 | A | * | 5/1974 | Barton et al. ................ 310/259 |
| 4,427,462 | A | * | 1/1984 | Senno et al. ................. 148/308 |
| 4,545,827 | A | | 10/1985 | Rastogi ........................ 148/308 |
| 4,621,850 | A | | 11/1986 | Wiersema et al. ........ 294/81.61 |
| 5,420,471 | A | * | 5/1995 | Yun ............................. 310/216 |
| 6,340,399 | B1 | | 1/2002 | Tanaka et al. ............... 148/308 |

FOREIGN PATENT DOCUMENTS

GB 1525276 9/1978

OTHER PUBLICATIONS

Patent Abstracts of Japan, Aug. 8, 1986, vol. 10, No. 228 (E–426) and JP 61 062331 A, Mitsubishi Electric Corp, Mar. 31, 1986.
T. Waeckerle, et al, "Low cobalt content electrical sheets for optimized high power density rotating machines", Journal of Magnetism and Magnetic Materials, Elsevier Science Publishers, Amsterdam, NL, vol. 215–216, pp. 207–209.
M. Takashima, et al, "Nonoriented Electrical Steel Sheet with Low Iron Loss for High–Efficiency Motor Cores", IEEE Transactions on Magnetics, IEEE Inc., NY, US, vol. 35, No. 1, Part 2, 1999, pp. 557–561.
"Successful Retrofit of a 970–MVA Turbine–Generator", 1998, ABB Review, ABB ASEA Brown Boveri, Zurich, CH, NR. 3, pp. 3–10.

* cited by examiner

*Primary Examiner*—Burton Mullins
(74) *Attorney, Agent, or Firm*—Ernest Cusick; Gary M. Hartman; Domenica N. S. Hartman

(57) ABSTRACT

An electrical machine stator core and method for reducing electromagnetic losses and the consequent heating of the core. The stator core makes use of laminations made from an iron-aluminum alloy at the core-ends of the core, while laminations between the core-ends are formed of a ferromagnetic alloy different from the iron-aluminum alloy. Use of iron-aluminum alloy laminations at the core-ends makes possible a relatively simple technique for generator uprate, by removing laminations located at the core-ends of the stator core, and then installing replacement laminations formed of the iron-aluminum alloy at the core-end, again with the result that the laminations located at the core-ends are formed of an Fe—Al alloy that is different from the alloy of the laminations between the core ends.

23 Claims, 1 Drawing Sheet

STATOR CORE CONTAINING IRON-ALUMINUM ALLOY LAMINATIONS AND METHOD OF USING

BACKGROUND OF INVENTION

1. Field of the Invention

The present invention generally relates to dynamoelectric machines and stators therefor having cores formed of ferromagnetic laminations. More particularly, this invention relates to a stator core formed to include iron-aluminum alloy laminations in selected locations to reduce electromagnetic (core) losses.

2. Description of the Related Art

Generators, including large turbine-driven generators used in the production of electrical power, generally comprise a rotor coaxially supported within a bore formed by an annular-shaped stator. The rotor serves as a source of magnetic lines of flux that are produced by a wound coil carried on the rotor. The stator comprises a number of conductors in which voltage is induced by the rotor as the rotor rotates within the stator. The stator includes a stator core having slots that contain the conductors, or windings. The slots are located at the inner circumference of the core and extend in the axial direction, defining what may be termed teeth that project radially inward into the bore of the core. In addition to supporting the stator windings, the core must provide a low reluctance path for the lines of magnetic flux.

Stator cores for generators and other dynamoelectric machines are widely formed to have a laminate construction, in which a large number of laminations of a ferromagnetic material are axially stacked. Each lamination includes a layer of electrically insulating material to reduce eddy currents. Laminations are formed to have slots that must be aligned within the stack to define the winding slots of the core. Key bars may be employed at the outer circumference of the core to maintain the alignment of the laminations and the winding slots. Due to cost and material properties, iron-silicon (Fe—Si) alloys have been the standard material for stator core laminations, particular for large turbine-driven generators. A typical Fe—Si alloy for core laminations is a steel containing about 3 to about 3.5 weight percent silicon, with the balance being iron and low levels of carbon, manganese, etc. Alternative lamination alloys have been proposed, including an iron-aluminum alloy disclosed in U.S. Pat. No. 3,058,857 to Pavlovic et al., and an iron-silicon-aluminum alloy disclosed in U.S. Pat. No. 4,545,827 to Rastogi. The lamination alloy disclosed by Pavlovic et al. is said to contain about 1 to 10 weight percent aluminum, with the balance being essentially iron. Rastogi's alloy is said to contain, by weight, 0.15 to 0.25 percent silicon, 0.15 to 0.25 percent aluminum, with the balance being iron, controlled levels of manganese, and incidental impurities. Industry practice is to use a single alloy for all laminations of a stator core.

Radial and peripheral magnetic flux components in the core and the axial magnetic flux component (normal to the plane of the stator core-end) induce eddy currents and cause electromagnetic (core) losses in the core laminations. The axial magnetic flux component causes heating and additional eddy current losses in the core-ends, which limit machine capability. Radial and peripheral flux components have been pushed to the limit by magnetic saturation, losses, and mechanical design considerations. Various approaches have been proposed to reduce losses caused by the axial flux component. One such approach is to increase the air-gap length between the stator and the rotor at the core-ends of the stator core. For example, core-end stepping is a commonly-used technique in which the laminations at the core-ends have increasingly larger inner diameters toward the end of the core. While effective, aggressive core-end stepping can reduce the clamping pressure on the teeth of the core. Reducing the relative axial length of the rotor with respect to the stator is another technique that has been employed to reduce the core-end fringing flux. However, the shorter length of the rotor increases the excitation requirement, contributing to lower efficiencies and potentially a bigger thermal challenge.

In view of the above, it would be desirable to reduce core losses and heating, especially in machine core-ends, without sacrificing reliability, efficiency, and performance of a dynamoelectric machine.

SUMMARY OF INVENTION

The present invention provides an electrical machine stator core and a method for reducing electromagnetic losses and the consequent heating of the core. The stator core makes use of laminations made from an iron-aluminum alloy in place of the standard iron-silicon (Fe—Si) at the core-ends.

The stator core of this invention generally comprises a plurality of axially-aligned laminations, each of the laminations having an annular shape defining an outer circumference and an inner circumference. The stator core has oppositely-disposed core-ends and an intermediate portion therebetween. According to the invention, the laminations defining the core-ends are formed of an iron-aluminum alloy, and at least one of the laminations defining the intermediate portion is formed of a ferromagnetic alloy different from the iron-aluminum alloy. According to the invention, placement of the iron-aluminum alloy laminations at the core-ends offers the capability of reducing the electromagnetic losses and consequent heating of the cores, and provides additional potential benefits including improved thermal, electrical, magnetic and mechanical properties, the latter of which includes better ductility for improved machine reliability.

Use of iron-aluminum alloy laminations at the core-ends makes possible a relatively simple technique for generator uprate, by which a partial re-stacking of the core-ends can be an effective solution to reduce core-end losses and temperatures. Retrofitting a stator core in this manner generally comprises removing the laminations located at one or both of the core-ends of the stator core, and then installing replacement iron-aluminum alloy laminations at the core-end, with the result that the laminations located at the core-end are formed of an alloy that is different from the alloy of the laminations remaining at the intermediate portion of the stator core.

A significant advantage of this invention is the ability to reduce core losses and heating of a dynamoelectric machine, especially at the machine core-ends, without sacrificing reliability, efficiency, and performance. A particularly notable advantage is the ability to uprate an existing dynamoelectric machine by partially re-stacking the core-end laminations without necessitating the removal and replacement of all laminations of the stator core. The present invention also makes possible the optimization of a new machine by the selective installation of iron-aluminum alloy laminations at the core-ends.

Other objects and advantages of this invention will be better appreciated from the following detailed description.

DETAILED DESCRIPTION

Figure 1:
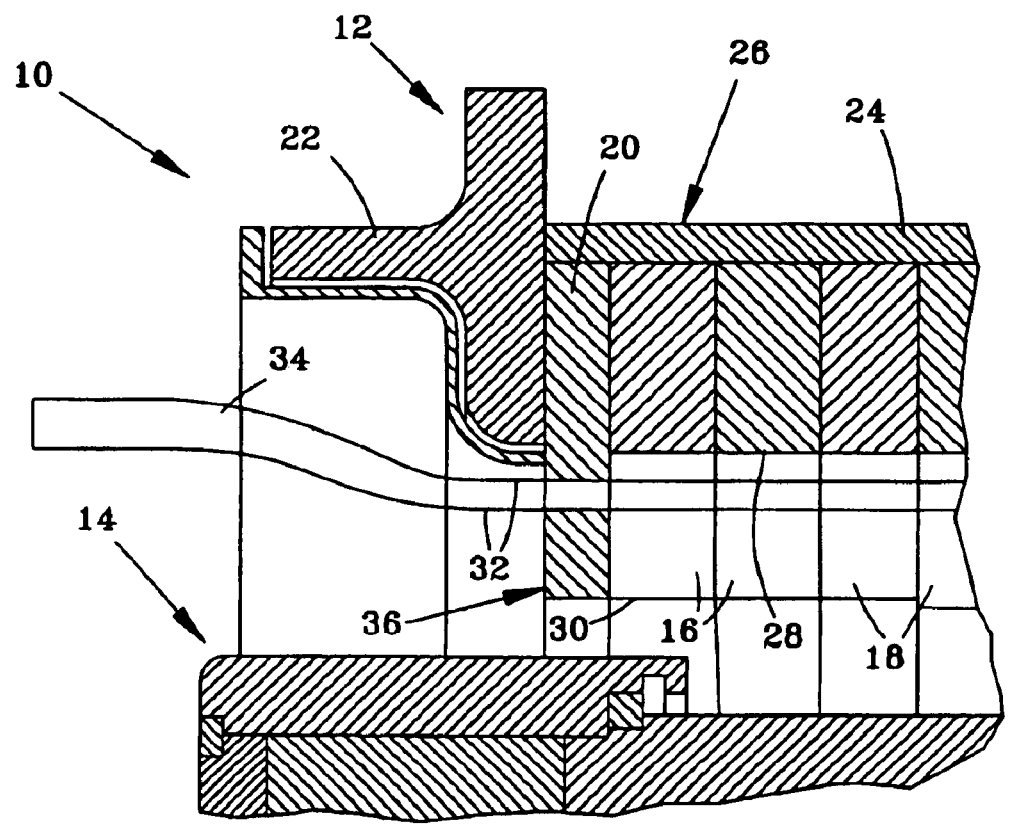
FIG. 1 is a fragmentary cross-sectional view of an electrical machine, showing the stator and rotor of the machine in the vicinity of the core-end.

FIG. 1 schematically represents a longitudinal cross-section of a portion of a dynamoelectric machine 10, revealing portions of the stator 12 and rotor 14 of the machine 10. A particular example of such a machine is a large turbine-driven generator used to produce electrical power. The stator 12 has a generally annular shape, defining a cylindrical bore within which the rotor 14 is coaxially supported by bearings (not shown) for rotational movement within the bore. The rotor 14 may have any suitable construction, such as a stack of laminations fixed coaxially on a shaft, sets of conductors passing through a number of axially extending slots formed in the outer circumference of the lamination stack, and the entire assembly secured by retaining rings.

In the particular example shown, the stator 12 is depicted as comprising a stack of laminations 16 and 18, each formed of a ferromagnetic material. Typical thicknesses for laminations 16 and 18 of the type represented in FIG. 1 are about 60 to about 80 millimeters. The laminations 16 and 18 are coaxially stacked and held together with outside space blocks 20, stator flanges 22 and keybars 24 (only one of each is shown in FIG. 1) to form a core 26, as generally known and practiced in the art. A number of slots 28 (one of which is visible in FIG. 1) extend along the axial length of the core 26 and in a radially outward direction into the inner circumferential surface 30 of the core 26. Each of the slots 28 accommodates a stator winding 32 having end turns 34 that project axially from the end (core-end) 36 of the core 26.

The core-ends 36 of the stator 12 are locations of core losses resulting from an axial field that arises from the stator and core-end winding currents, and from the fringing of the main air-gap field at the core-ends 36. The flux associated with this field induces eddy currents in the stator teeth (between the slots 28), and penetrate several inches into the stator core 26. Heating caused by the eddy currents is a limiting factor in the design of large turbo-generators. In addition, the axial fluxes add to the normal radial fluxes in the laminations 16 and 18 at the core-ends 36, increasing the level of saturation in the end teeth yoke.

The laminations 16 and 18 of conventional stators for dynamoelectric machines of the type represented in FIG. 1 have been typically formed of iron-silicon (Fe—Si) ferromagnetic alloys, a notable example being AISI M-6, which is an oriented silicon steel containing about 3 to about 3.5 weight percent silicon. Fe—Si alloys such as M-6 are widely used because of their good physical properties and relatively low cost. According to the present invention, the use of laminations formed of an iron-aluminum (Fe—Al) ferromagnetic alloy at the core-ends 36, e.g., represented by the laminations 16 in FIG. 1, can improve the mechanical, thermal, magnetic, and electrical properties of the stator core 26, with the additional advantage of potentially lowering cost. Notably, a preferred aspect of the invention is to assemble a new stator core 26 or uprate or retrofit an existing stator core 26 so that only those laminations 16 at the core-end 36 are formed of an Fe—Al alloy, while the laminations 18 located within the remaining intermediate portion of the core 26 are formed of a different ferromagnetic alloy, such as a conventional Fe—Si alloy. Consequently, certain advantages of using Fe—Si alloy laminations are retained, such as cost and physical properties, while the overall mechanical, thermal, magnetic, and electrical properties of the stator core 26 are improved as a result of the Fe—Al alloy laminations 16 of the invention.

A suitable Fe—Al alloy for the laminations 16 of this invention contains about 2 to about 16 weight percent aluminum, up to about 17 weight percent cobalt, with the balance iron and incidental impurities. An Fe—Al alloy found to be suitable for use with the invention has a nominal composition by weight of about 6.5% aluminum, with the balance iron and incidental impurities. Preferred Fe—Al alloys exhibit relatively high ductility as compared to Fe—Si alloys, allowing for the use of a relatively high aluminum content that greatly increases the resistivity of the alloy. In contrast, a high silicon content in conventional Fe—Si alloys leads to a sharp decrease in ductility.

Preliminary investigations indicate that a suitable lamination thickness to achieve the advantages of this invention is about 0.37 millimeter and less, with thicknesses of about 0.2 to about 0.35 millimeter being preferred. As a result of their greater ductility, the Fe—Al alloy laminations 16 can be fabricated to have thicknesses of as little as about 0.1 millimeter, which is significantly thinner than possible with Fe—Si alloys. On the other hand, higher resistivity allows the use of thicker laminations 16 without increasing losses as compared to conventional Fe—Si alloys, thereby reducing manufacturing costs and increasing the stacking factor (the ratio of the metal thickness to insulation thickness in the stacked core 26). Material cost may also be reduced for the same volume as a result of the density of suitable Fe—Al alloys being about 7% to 8% lower than that of Fe—Si alloys conventionally used to form stator laminations.

While the core 26 represented in FIG. 1 is depicted as containing only two of the Fe—Al laminations 16, significantly greater numbers of these laminations 16 are preferably used to achieve the benefits of this invention. Reductions in eddy current losses at the core-ends 36 of as much as about 20% to about 30% are believed possible by using as few as about one hundred fifty to eight hundred of the Fe—Al laminations 16 of this invention at each core-end 36 of the core 26 in place of conventional Fe—Si laminations. Notably, with the ability to form thinner Fe—Al laminations 16, it is possible to replace about six hundred Fe—Si laminations with as many as eight hundred of the Fe—Al laminations 16 of this invention. Preliminary tests have indicated that the hysteresis loop for the preferred Fe—Al alloy may be smaller, which will reduce the corresponding core losses. Further reductions in losses may be achieved with the use of thinner laminations 16, again made possible because suitable Fe—Al ferromagnetic alloys are more ductile than Fe—Si ferromagnetic alloys. With losses substantially reduced, the cooling requirements of the core 26 may also be reduced, allowing for the elimination of vent ducts typically employed in large generator stator cores. In view of the above, the Fe—Al laminations 16 of this invention can provide significant material savings and improve mechanical, electromagnetic, and thermal properties of a stator core 26 relative to conventional Fe—Si alloys, while allowing for core re-stacking or uprating of an electrical machine without any machine redesign and with minimal installation time.

While the invention has been described in terms of a preferred embodiment, it is apparent that other forms could be adopted by one skilled in the art. For example, the use of the Fe—Al alloy laminations of this invention can be extended to other applications that need to carry alternating magnetic flux, such as transformers, rotating, reciprocating, linear-type electrical machines, electro-mechanical actuators, etc. Therefore, the scope of the invention is to be limited only by the following claims.

What is claimed is:

1. A stator core for an electric machine, the stator core comprising a plurality of axially-aligned laminations, each of the laminations having an annular shape defining an outer circumference and an inner circumference, the stator core having oppositely-disposed core-ends and an intermediate portion therebetween, the laminations defining the core-ends being formed of an iron-aluminum alloy, at least one of the laminations defining the intermediate portion being formed of a ferromagnetic alloy different from the iron-aluminum alloy and having lower ductility than the iron-aluminum alloy.

2. A stator core according to claim 1, wherein the laminations formed of the ferromagnetic alloy and defining the intermediate portion are thicker than the laminations formed of the iron-aluminum alloy and defining the core-ends.

3. A stator core according to claim 1, wherein the laminations formed of the ferromagnetic alloy and defining the intermediate portion are thinner than the laminations formed of the iron-aluminum alloy and defining the core-ends.

4. A stator core according to claim 1, wherein the ferromagnetic alloy is an oriented iron-silicon alloy that consists of silicon, iron and incidental impurities.

5. A stator core according to claim 4, wherein the iron-silicon alloy contains about 3 to about 3.5 weight percent silicon.

6. A stator core according to claim 1, wherein the iron-aluminum alloy consists of aluminum, cobalt and iron with incidental impurities.

7. A stator core according to claim 6, wherein the iron-aluminum alloy contains about 2 to about 16 weight percent aluminum.

8. A stator core according to claim 1, wherein the laminations have thicknesses of about 0.1 to about 0.35 millimeter, the laminations formed of the ferromagnetic alloy and defining the intermediate portion are thicker than the laminations formed of the iron-aluminum alloy and defining the core-ends, and up to eight hundred of the laminations formed of the iron-aluminum alloy define each of the core-ends of the stator core.

9. A stator core according to claim 1, wherein the stator core is installed in the electric machine.

10. A stator core installed in a dynamoelectric machine, the stator core having an annular shape defining an outer circumference and an inner circumference receiving a rotor of the dynamoelectric machine, the stator core comprising a plurality of axially-aligned laminations, each of the laminations having an annular shape defining an outer circumference and an inner circumference corresponding to the outer and inner circumferences, respectively, of the stator core, the stator core having oppositely-disposed core-ends and an intermediate portion therebetween, the laminations defining the core-ends being formed of an iron-aluminum alloy containing about 2 to about 16 weight percent aluminum, the laminations defining the intermediate portion being formed of a ferromagnetic oriented iron-silicon alloy different from the iron-aluminum alloy and having lower ductility than the iron-aluminum alloy.

11. A stator core according to claim 10, wherein the iron-aluminum alloy consists of aluminum, cobalt, and iron with incidental impurities.

12. A stator core according to claim 10, wherein the laminations formed of the iron-silicon alloy and defining the intermediate portion are thinner than the laminations formed of the iron-aluminum alloy and defining the core-ends.

13. A stator core according to claim 10, wherein the iron-silicon alloy consists of silicon, iron and incidental impurities.

14. A stator core according to claim 10, wherein the laminations have thicknesses of about 0.2 to about 0.35 millimeter, the laminations formed of the iron-silicon alloy and defining the intermediate portion are thicker than the laminations formed of the iron-aluminum alloy and defining the core-ends, and about one hundred fifty to about eight hundred of the laminations formed of the iron-aluminum alloy define each of the core-ends of the stator core.

15. A method of retrofitting a stator core of an electric machine, the stator core comprising a plurality of axially-aligned laminations formed of a ferromagnetic alloy, each of the laminations having an annular shape defining an outer circumference and an inner circumference, the stator core have oppositely-disposed core-ends and an intermediate portion therebetween, the method comprising the steps of:

removing the laminations defining at least one of the core-ends; and installing replacement laminations at the at least one core-end, the replacement laminations being formed of an iron-aluminum alloy that is different from and more ductile than the ferromagnetic alloy of the laminations remaining at the intermediate portion.

16. A method according to claim 15, wherein the ferromagnetic alloy is an oriented iron-silicon alloy.

17. A method according to claim 15, wherein the iron-aluminum alloy consists of aluminum, cobalt, and iron with incidental impurities.

18. A method according to claim 17, wherein the iron-aluminum alloy contains about 2 to about 16 weight percent aluminum.

19. A method according to claim 15, wherein the replacement laminations have thicknesses of about 0.1 to about 0.35 millimeter and are thinner than the laminations remaining at the intermediate portion, up to six hundred of the laminations defining the at least one core-end are removed, and up to about eight hundred of the replacement laminations are installed at the at least one core-end.

20. A method of retrofitting a stator core of a dynamoelectric machine, the stator core having an annular shape defining an outer circumference and an inner circumference adapted for receiving a rotor of the dynamoelectric machine, the stator core comprising a plurality of axially-aligned laminations formed of a ferromagnetic oriented iron-silicon alloy, each of the laminations having an annular shape defining an outer circumference and an inner circumference corresponding to the outer and inner circumferences, respectively, of the stator core, the stator core having oppositely-disposed core-ends and an intermediate portion therebetween, the method comprising the steps of:

removing the laminations defining the core-ends; and installing replacement laminations at the core-ends, the replacement laminations being formed of an iron-aluminum alloy that is different from and more ductile than the ferromagnetic iron-silicon alloy of the laminations remaining at the intermediate portion, the iron-aluminum alloy containing about 2 to about 16 weight percent aluminum.

21. A method according to claim 20, wherein the iron-aluminum alloy consists of aluminum, cobalt, and iron with incidental impurities.

22. A method according to claim 20, wherein the laminations remaining at the intermediate portion are thinner than the replacement laminations.

23. A method according to claim 20, wherein the replacement laminations have thicknesses of about 0.2 to about 0.35 millimeter and are thinner than the laminations remaining at the intermediate portion up to six hundred of the laminations are removed at each of the core-ends, and up to about eight hundred of the replacement laminations are installed at each of the core-ends.

* * * * *